US010802781B2

(12) United States Patent
Oho

(10) Patent No.: US 10,802,781 B2
(45) Date of Patent: Oct. 13, 2020

(54) DISPLAY DEVICE

(71) Applicant: FANUC CORPORATION, Yamanashi (JP)

(72) Inventor: Yusaku Oho, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/369,347

(22) Filed: Mar. 29, 2019

(65) Prior Publication Data
US 2019/0310815 A1 Oct. 10, 2019

(30) Foreign Application Priority Data

Apr. 5, 2018 (JP) .................. 2018-073268

(51) Int. Cl.
G06F 3/0484 (2013.01)
G06F 3/14 (2006.01)
G05B 19/402 (2006.01)
B23Q 3/12 (2006.01)

(52) U.S. Cl.
CPC ............... G06F 3/14 (2013.01); B23Q 3/12 (2013.01); G05B 19/402 (2013.01); G06F 3/04842 (2013.01); G05B 2219/37336 (2013.01)

(58) Field of Classification Search
CPC .................................. G06F 3/04842
USPC ....................................... 715/771
See application file for complete search history.

(56) References Cited

U.S. PATENT DOCUMENTS

| 5,610,842 | A | * | 3/1997 | Seki | G05B 19/4069 345/473 |
| 7,949,422 | B1 | * | 5/2011 | Little | G05B 19/409 700/180 |
| 10,156,838 | B2 | * | 12/2018 | Karl | G05B 19/409 |
| 2003/0065424 | A1 | * | 4/2003 | Erichsen | B26F 3/004 700/281 |
| 2003/0170085 | A1 | * | 9/2003 | Kakino | G05B 19/40937 409/132 |
| 2004/0181307 | A1 | * | 9/2004 | Hirai | G05B 19/4103 700/194 |
| 2008/0132146 | A1 | * | 6/2008 | Yonezu | G05B 19/4166 451/5 |

(Continued)

FOREIGN PATENT DOCUMENTS

| JP | 6033929 B1 | 9/2012 |
| JP | 6599523 B1 | 10/2014 |
| JP | 6001720 B1 | 10/2016 |

Primary Examiner — Daniel Rodriguez
(74) Attorney, Agent, or Firm — Studebaker & Brackett PC

(57) ABSTRACT

A display device acquires and displays path information of a feed axis of a machine tool that includes a spindle for relatively rotating a workpiece and a cutting tool and at least one feed axis for relatively feeding the workpiece and the cutting tool and that performs machining on the workpiece while making the cutting tool and the workpiece swing relatively, and includes a display unit and a selection unit, the display unit relatively highlights, in the path information, a selection path which includes the part selected by the selection unit and at least one of adjacent paths preceding and subsequent to the selection path with respect to the path of the path information other than the selection path and the adjacent paths and the selection path and the adjacent paths are paths corresponding to one revolution or a plurality of revolutions of the spindle.

10 Claims, 9 Drawing Sheets

(56) References Cited

U.S. PATENT DOCUMENTS

| | | | |
|---|---|---|---|
| 2008/0177407 A1* | 7/2008 | Yonezu | G05B 19/4093 700/97 |
| 2011/0015877 A1* | 1/2011 | Okita | G05B 19/409 702/41 |
| 2013/0076287 A1* | 3/2013 | Iwashita | G05B 19/4068 318/561 |
| 2015/0105890 A1* | 4/2015 | Stochosky | G05B 19/414 700/98 |
| 2015/0202728 A1* | 7/2015 | Ebihara | G05B 19/19 279/3 |
| 2015/0290759 A1* | 10/2015 | Nakanishi | G05B 19/409 715/772 |
| 2016/0011579 A1* | 1/2016 | Watanabe | G05B 19/4103 700/187 |
| 2016/0176055 A1* | 6/2016 | McGlinchy | B25J 9/1664 700/160 |
| 2017/0343983 A1* | 11/2017 | Yu | G05B 19/408 |
| 2018/0282844 A1* | 10/2018 | Shinohara | B22F 5/106 |
| 2019/0210122 A1* | 7/2019 | Fujita | C23C 14/3407 |

* cited by examiner

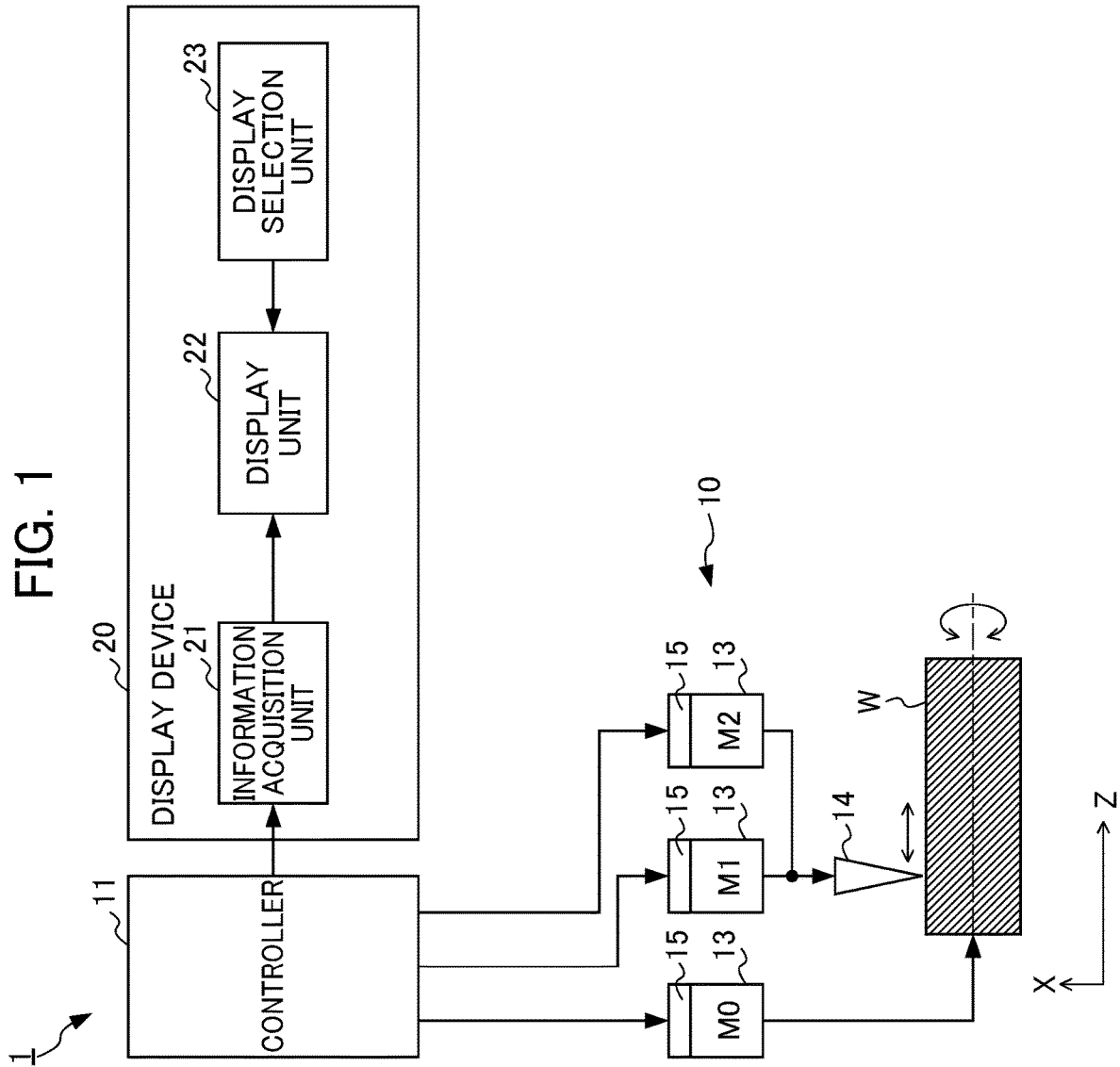

DISPLAY DEVICE

This application is based on and claims the benefit of priority from Japanese Patent Application No. 2018-073268, filed on 5 Apr. 2018, the content of which is incorporated herein by reference.

BACKGROUND OF THE INVENTION

Field of the Invention

The present invention relates to a display device of a machine tool which performs turning on a workpiece by a coordinated operation of a spindle and a feed axis, and more particularly relates to a display device which displays a path of the feed axis of a machine tool that performs swinging cutting.

Related Art

When a workpiece is machined with a cutting tool of a machine tool, if chips are continuously generated, the chips may become entangled in the cutting tool. In such a case, it is necessary to stop the machine tool in order to remove the chips from the cutting tool, and thus it takes much time, with the result that the production efficiency thereof is lowered. Furthermore, the chips may damage the workpiece, and thus the quality of the workpiece may be lowered. In order to avoid such a defect, swinging cutting is known in which the cutting tool and the workpiece are made to swing relatively in the direction of machining, and in which thus the chips are shredded (see, for example, Patent Document 1 and Patent Document 2). The controller of the machine tool which performs the swinging cutting provides a sinusoidal feed command to a servo motor for a feed axis that feeds the cutting tool or the workpiece in the direction of the machining, and thereby makes the cutting tool and the workpiece swing relatively in the direction of the machining. Conventionally, a waveform display device is known which can display, as waveforms, command data that is calculated with a computer numerical controller (CNC) according to a machining program and that is commanded to the servo motors of the individual axes of a machine tool, actual position data that is output from position detection devices included in the individual axes and the like (for example, Patent Document 3).

Patent Document 1: Japanese Patent No. 5033929
Patent Document 2: Japanese Patent No. 5599523
Patent Document 3: Japanese Patent No. 6001720

SUMMARY OF THE INVENTION

In order to shred the chips as intended in the swinging cutting described above, it is necessary to previously determine the frequency, the amplitude and the like of the feed command for using the feed axis to make the cutting tool or the workpiece swing periodically in the direction of the machining of the workpiece. In general, in the computer numerical controller of a machine tool, an NC program which can set machining conditions such as a spindle revolution number and a feedrate and various types of parameters is produced and stored, and the feed command for the swinging operation described above is calculated according to the NC program. Hence, an operator changes the machining conditions and the various types of parameters set in the NC program within the computer numerical controller so as to determine the frequency, the amplitude and the like of the feed command for the swinging operation. In the operation as described above, it is preferably possible to check how the command data and the actual position data for the feed axis that performs the swinging operation are changed according to the change of the machining conditions and the various types of parameters set in the NC program within the computer numerical controller, and the waveform display device as described above is useful. However, it is disadvantageously difficult to determine whether or not the chips can be shredded with the cutting tool only by simply displaying, as a waveform, a chronological change of the command data or the actual position data on the feed axis which performs the swinging operation.

An object of the present invention is to provide a display device with which an operator can visually and easily determine whether or not chips can be shredded in swinging cutting.

(1) A display device (for example, a display device 20 which will be described later) according to the present invention acquires and displays path information of a feed axis of a machine tool (for example, a machine tool 10 which will be described later) that includes a spindle (for example, a spindle M0 which will be described later) for relatively rotating a workpiece (for example, a workpiece W which will be described later) and a cutting tool (for example, a cutting tool 14 which will be described later) and at least one of the feed axis (for example, a feed axis M1, M2 which will be described later) for relatively feeding the workpiece and the cutting tool and that performs machining on the workpiece while making the cutting tool and the workpiece swing relatively, and includes: a display unit (for example, a display unit 22 which will be described later) that displays the path information of the feed axis; and a selection unit (for example, a display selection unit 23 which will be described later) that selects part of the path information, the display unit relatively highlights, in the path information, a selection path (for example, a selection path A1 which will be described later) which includes the part selected by the selection unit and at least one of adjacent paths (for example, adjacent paths A0, A2 which will be described later) preceding and subsequent to the selection path with respect to the path of the path information other than the selection path and the adjacent paths and the selection path and the adjacent paths are paths corresponding to one revolution or a plurality of revolutions of the spindle.

(2) In the display device described in (1), the display unit may display, as the path information of the feed axis, information indicating a relationship between the phase of the spindle and the position of the feed axis.

(3) In the display device described in (1), the display unit may display, as the path information of the feed axis, information indicating a chronological change of the position of the feed axis.

(4) In the display device described in any one of (1) to (3), the display unit may relatively highlight the selection path with respect to the adjacent paths.

(5) In the display device described in any one of (1) to (4), the display unit may relatively change the display attribute of the selection path and the display attribute of the adjacent paths with respect to the display attribute of the path other than the selection path and the adjacent paths so as to perform highlighting.

(6) In the display device described in (4), the display unit may relatively change the display attribute of the selection path with respect to the display attribute of the adjacent paths so as to perform highlighting.

(7) In the display device described in any one of (1) to (6), the feed axis may include a first feed axis and a second feed axis, the display unit may superimpose and display first path information of the first feed axis and second path information of the second feed axis, may relatively highlight, in the first path information, a first selection path (for example, a first selection path A1 which will be described later) including the part selected by the display selection unit and at least one of first adjacent paths (for example, first adjacent paths A0, A2 which will be described later) preceding and subsequent to the first selection path with respect to the path of the first path information other than the first selection path and the first adjacent paths and may relatively highlight, in the second path information, a second selection path (for example, a second selection path A11 which will be described later) corresponding to the first selection path and at least one of second adjacent paths (for example, second adjacent paths A10, A12 which will be described later) preceding and subsequent to the second selection path with respect to the path of the second path information other than the second selection path and the second adjacent paths and the first selection path, the first adjacent paths, the second selection path and the second adjacent paths may be paths corresponding to one revolution or a plurality of revolutions of the spindle.

According to the present invention, it is possible to provide a display device with which an operator can visually and easily determine whether or not chips can be shredded in swinging cutting.

BRIEF DESCRIPTION OF THE DRAWINGS

FIG. 1 is a diagram showing a machining system which includes a display device according to the present embodiment;

DETAILED DESCRIPTION OF THE INVENTION

Figure 2A:
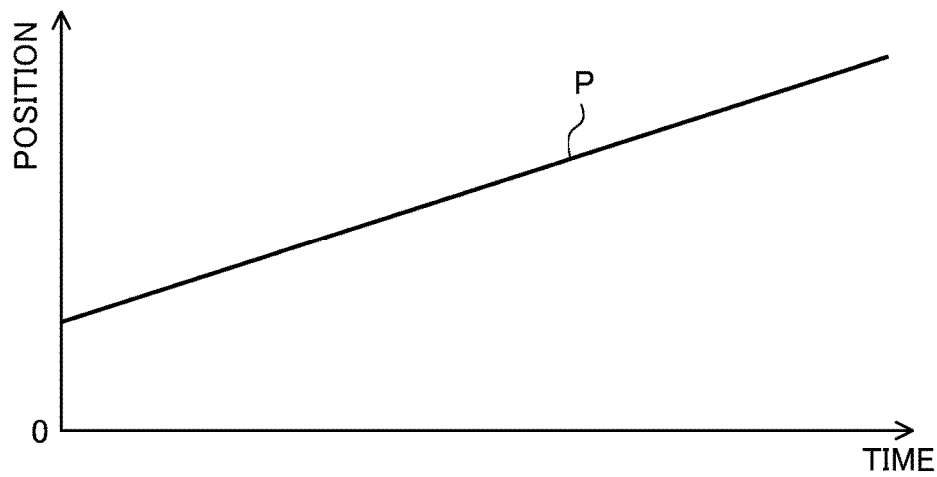
FIG. 2A is a diagram showing a position command for feed axes which is calculated by a controller shown in FIG. 1.

Examples of the embodiment of the present invention will be described below with reference to accompanying drawings. In the drawings, the same or corresponding parts are identified with the same reference numerals.

First Embodiment

FIG. 1 is a diagram showing a machining system which includes a display device according to the present embodiment. The machining system 1 shown in FIG. 1 includes a machine tool 10, a controller 11 which controls the machine tool 10 and the display device 20.

The machine tool 10 includes a cutting tool 14, for example, a byte (tool bit). The cutting tool 14 performs machining on a workpiece which has, for example, a tubular shape, a cylindrical shape, a conical shape or a truncated conical shape. The shape of the workpiece W may be a shape other than a cylindrical shape, and the machine tool 10 is not limited to a machine tool which performs machining and may be a machine tool which performs grinding, polishing or the like. However, in the following description, as shown in FIG. 1, it is assumed that, with the cutting tool 14, turning is performed on the outer circumferential surface of the workpiece W which is rotated and cylindrical. A description will be given using, as an example, a configuration in which the workpiece W is rotated and in which the cutting tool 14 swings along the generatrix of the outer circumferential surface of the workpiece W.

The machine tool 10 includes a plurality of drive axes 13. The individual drive axes 13 are controlled by the controller 11 such as a CNC (Computer Numerical Controller) or a PLC (Programmable Logic Controller). Although FIG. 1 shows the machine tool 10 which includes three drive axes 13, the number of drive axes 13 is not limited, and the machine tool 10 can include a necessary number of drive axes. The drive axes 13 include a spindle M0 and at least two feed axes M1 and M2 which perform a coordinated operation with the spindle M0. The spindle M0 includes a spindle motor or a servo motor. The feed axes M1 and M2 include a ball screw mechanism or a feed mechanism such as a linear slider and a servo motor which drives the feed mechanism.

In FIG. 1, it is assumed that the center axis line of the workpiece serving as the rotation axis of the workpiece W is a Z axis and that an axis line perpendicular to the Z axis is an X axis. Furthermore, the spindle M0 rotates the workpiece W about the center axis line (Z axis) of the workpiece. The feed axis M1 can both feed the cutting tool 14 in a first direction (hereinafter referred to as the direction of machining) along the direction of the Z axis and reciprocate the cutting tool 14 in the first direction, that is, make the cutting tool 14 swing. The feed axis M2 can both feed the cutting tool 14 in a second direction (hereinafter referred to as the direction of cutting) along the direction of the X axis and reciprocate the cutting tool 14 in the second direction, that is, make the cutting tool 14 swing. When the turning is performed on the workpiece which has a cylindrical shape or a tubular shape, the workpiece is rotated about the center axis line (Z axis) of the workpiece, and the cutting tool 14 is fed in only the first direction (the direction of the machining) along the direction of the Z axis. In this case, the feed axis M2 is basically unnecessary.

When the turning is performed on the workpiece, such as a workpiece having a conical shape, a truncated conical shape or the like, whose outside diameter differs in the direction of the Z axis, the workpiece W is rotated about the center axis line (Z axis) of the workpiece, and the cutting tool 14 is fed in the combined direction of the direction of the X axis and the direction of the Z axis. In this case, in order to feed the cutting tool 14 along the generatrix of the outer circumferential surface of the workpiece W in an oblique direction, at least two feed axes M1 and M2 are needed. Both the feed axis M1 and the feed axis M2 are controlled, and thus the cutting tool 14 is fed along the generatrix of the outer circumferential surface of the workpiece W in the oblique direction.

In the controller 11, a machining program (NC program) which can set machining conditions such as a spindle revolution number (S) and a feedrate (F) and various types of parameters is produced and stored. The controller 11 includes an operator's panel (not shown) with which the machining conditions and the various types of parameters set in the machining program can be changed.

The controller 11 can calculate, according to the machining program, commands for individually operating the drive axes 13 such as the spindle M0, the feed axis M1 and the feed axis M2 and transmit the calculated commands to the corresponding drive axes 13 such as the spindle M0, the feed axis M1 and the feed axis M2. In a configuration in which as in the example of FIG. 1, the workpiece W is rotated with the spindle M0 and in which the cutting tool 14 is fed with the feed axes M1, M2 and the like, the controller 11 transmits a command for a predetermined rotation speed to the spindle M0 and transmits a command for a predetermined target position to the feed axes M1, M2 and the like.

The machining system 1 includes, for each of the drive axes 13 such as the spindle M0, the feed axis M1 and the feed axis M2, a position detection device 15 which detects the position of the drive axis 13. In particular, as shown in FIG. 1, in the configuration in which the workpiece W is rotated with the spindle M0, as the position detection device 15 of the spindle M0, a sensor which can detect the rotation position (angle) of the workpiece W, for example, a rotary encoder can be used. The rotary encoder can also detect the rotation speed of the workpiece W. As the position detection device 15 of the feed axis M1 shown in FIG. 1, a sensor which can detect the position of the cutting tool 14 in the direction of the machining of the workpiece W, for example, an encoder can be used. As the position detection device 15 of the feed axis M2, a sensor which can detect the position of the cutting tool 14 in the direction of the cutting described above, for example, an encoder can be used. However, as long as the position detection devices 15 of the feed axes M1 and M2 can acquire the positions (the position of the cutting tool 14 in the example of FIG. 1) of the feed axes M1 and M2, any device may be used, and they are not limited to the encoder described above. The position detection devices 15 of the feed axes M1 and M2 may be, for example, a position measuring device which is arranged apart from the drive axis 13 and which includes a laser tracker, a three-dimensional position sensor or the like. The controller 11 controls the drive axes 13 such that the commands transmitted to the drive axes 13 as described previously agree with the position data of the drive axes 13 fed back from the position detection devices 15 of the drive axes 13 to the controller 11.

Furthermore, in order to shred chips generated by the turning, the controller 11 has the function of controlling the feed axis M1 such that the cutting tool 14 and the workpiece W are made to relatively swing in the first direction (the direction of the machining) described previously so as to perform intermittent cutting. A feed command of the feed axis M1 for performing the intermittent cutting as described above is also calculated by the controller 11 according to the machining program. An operator uses the operator's panel (not shown) of the controller 11 so as to change the machining conditions and the various types of parameters, and thereby can determine the frequency, the amplitude and the like of the feed command for the intermittent cutting. The intermittent cutting described above means that machining is performed on the workpiece W while the cutting tool 14 is periodically brought into contact with the workpiece W and separated from the workpiece W, and is also referred to as swinging cutting or vibration cutting.

The feed command for the intermittent cutting described above is calculated by, for example, the following method. The controller 11 first calculates a position command for the feed axis M1 on feeding in the first direction (the direction of the machining) along the direction of the Z axis in FIG. 1 based on a machining start point, a machining end point, the rotation speed of the spindle M0 (the rotation speed of the workpiece W in the example of FIG. 1), the feedrate by the feed axis M1 (the feedrate of the cutting tool 14 in the example of FIG. 1) and the like which are set in the machining program. Then, the controller 11 calculates, based on the rotation speed, the feedrate and the various types of parameters described above, the swinging command of the feed axis M1 for producing the swinging (reciprocating movement) of the cutting tool 14 in the direction of the machining described above. Furthermore, the controller 11 adds the position command and the swinging command together so as to calculate the feed command (combination command) for the intermittent cutting described above.

Figure 2B:
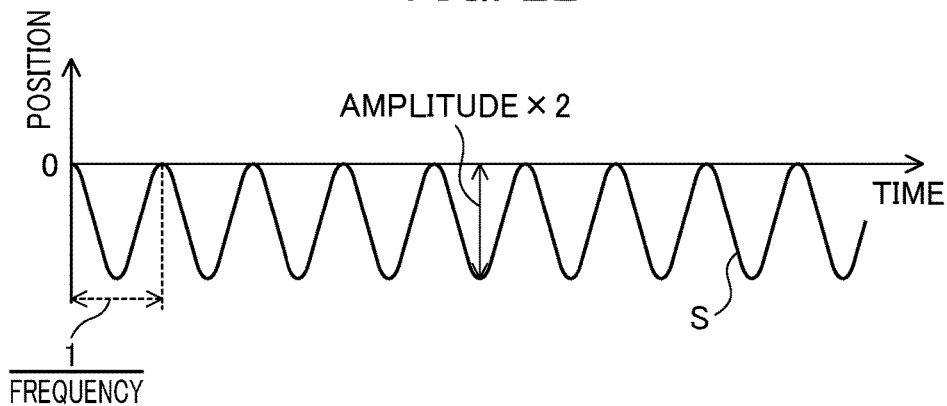
FIG. 2B is a diagram showing a swinging command for the feed axes which is calculated by the controller shown in FIG. 1.
Figure 2C:
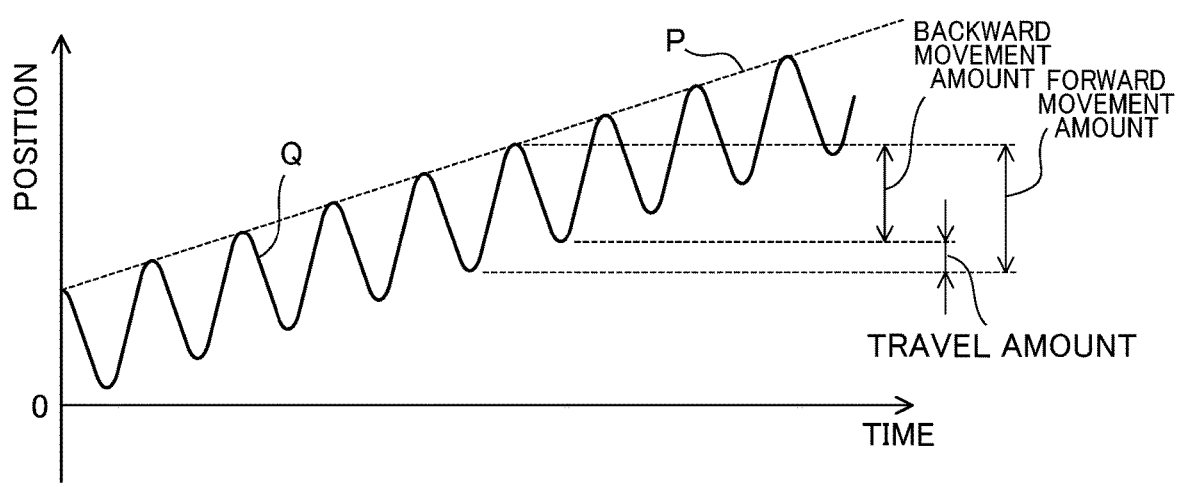
FIG. 2C is a diagram showing a feed command obtained by adding the swinging command shown in FIG. 2B to the position command shown in FIG. 2A.

Here, FIG. 2A is a diagram showing the position command described above, a horizontal axis represents time and a vertical axis represents a position (position command value) in the direction of the machining. In the position command, as time passes, the position command value of the feed axis M1 is linearly increased (see a straight line P). FIG. 2B is a diagram showing the swinging command described above, a horizontal axis represents time and a vertical axis represents a position (position command value) in the direction of the machining. In the swinging command, as time passes, the position command value of the feed axis M1 is periodically increased and decreased (see a wavy curve S). As is found from FIG. 2B, the amplitude and the frequency in the swinging command are changeable, and thus it is possible to obtain the swinging commands of various vibration waveforms. In this example, the rotation speed of the workpiece W and the feedrate of the cutting tool 14 are individually set constant, and thus the frequency and the amplitude of the swinging command are constant even though time passes. FIG. 2C is a diagram showing a feed command (combination command) which is obtained by adding the swinging command shown in FIG. 2B to the position command shown in FIG. 2A, a horizontal axis represents time and a vertical axis represents a position (position command value) in the direction of the machining. The path of the cutting tool 14 follows the feed command shown in FIG. 2C. More specifically, as shown in FIG. 2C, by the feed command (see a wavy curve Q), in one round of the reciprocating movement, the cutting tool 14 is moved backward by only a predetermined backward movement amount and is then moved forward by only a predetermined forward movement amount so as to be moved by only a travel amount which is a difference therebetween. As described above, in the present embodiment, by the feed axis M1, the cutting tool 14 is fed in the direction of the machining while being reciprocated (made to swing) in the direction of the machining, and thus the intermittent cutting is performed.

The swinging command described above is a cosine wave-shaped command indicated by the wavy curve S in FIG. 2B, and is defined as a formula below.

swinging command=$(K \times F/2) \times \cos(2\pi \times S/60 \times I \times t) - (K \times F/2)$   formula (1)

In formula (1), K represents a swinging amplitude magnification, F represents the amount of movement of the cutting tool 14 per revolution of the workpiece W, that is, a feed amount per revolution [mm/rev], S represents the rotation speed of the workpiece W about the center axis line [min$^{-1}$] or [rpm] and I represents a swinging frequency magnification. Here, the swinging frequency, that is, the frequency of the swinging command corresponds to a term of (S/60×I) in formula (1), and the swinging amplitude, that is, the amplitude of the swinging command corresponds to a term of (K×F/2) in formula (1). However, the swinging amplitude magnification K is a number equal to or greater than one, and the swinging frequency magnification I is a non-integer greater than zero (for example, a positive non-integer such as 0.5, 0.8, 1.2, 1.5, 1.9, 2.3 or 2.5, . . . ). The swinging amplitude magnification K and the swinging frequency magnification I are constants.

In formula (1) described above, the swinging command is a command in which the term of (K×F/2) is subtracted as an offset value with respect to a cosine wave where the position of zero is a reference axis line. Hence, the feed command (the wavy curve Q in FIG. 2C) obtained by adding the swinging command to the position command is a command which does not exceed the position command (the straight line in FIG. 2C) in the direction of the machining. Thus, the path of the position of the cutting tool 14 based on the feed command (the wavy curve Q) can be controlled with the assumption that, in the direction of the machining of the cutting tool 14, the position according to the position command is an upper limit. Furthermore, the swinging command of the cosine wave as indicated by formula (1) is provided, and thus as is found from the wavy curve Q in FIG. 2C, large swinging is prevented from being produced at the machining start point (position of 0° in the horizontal axis) of the cutting tool 14 in the direction of the feeding of the cutting tool 14 from the beginning. The reason why the swinging frequency magnification I is not set to an integer is that in the case of a swinging frequency which is exactly equal to the number of revolutions of the workpiece W about the center axis line, overlapping parts B1, B2 and the like (see FIG. 3) as described later cannot be produced, and that thus it is impossible to obtain the effect of shredding chips by swinging cutting.

It is assumed that formula (1) described above is described in the machining program within the controller 11. The operator's panel (not shown) of the machine tool 10 can provide the values of the swinging amplitude magnification K and the swinging frequency magnification I to formula (1) described in the machining program within the controller 11. It is assumed that the rotation speed S [min$^{-1}$] of the workpiece W and the feedrate [mm/min] of the cutting tool 14 are previously set, as machining conditions, in the machining program within the controller 11. The controller 11 calculates the feed amount per revolution F (=feedrate/rotation speed S) in formula (1) described above from the feedrate and the rotation speed as described above, and can calculate the swinging command by formula (1) described above to which the values of the swinging amplitude magnification K and the swinging frequency magnification I are previously provided.

The machining system 1 of the present embodiment includes the display device 20 which displays information on the machine tool 10 when in order to shred chips generated in the turning, the cutting tool 14 and the workpiece W are made to relatively swing in the direction of the machining so as to perform the intermittent cutting. As described previously, the feed command of the feed axis M1 for performing the intermittent cutting is calculated by the controller 11, and the display device 20 is a device which makes the operator visually recognize the feed command as described above and the actual position of the feed axis M1 driven by the feed command. However, in a method of simply displaying, on a display screen, the command value of the feed command for the intermittent cutting, it is difficult for the operator to determine whether or not the chips can be shredded with the cutting tool 14. Even in a method of detecting, with the position detection device 15, the actual position of the feed axis M1 driven by the feed command for the intermittent cutting so as to display the detection value thereof on the display screen, it is difficult for the operator to determine, from the display screen, whether or not the chips can be shredded.

Hence, as shown in FIG. 1, the display device 20 of the present embodiment includes an information acquisition unit 21, a display unit 22, and a display selection unit 23.

Although in the configuration example shown in FIG. 1, the display device 20 is arranged outside and away from the controller 11, the display device 20 may be provided in the operator's panel (not shown) of the machine tool 10 or may be provided integrally with the controller 11. The display unit 22 can be a display panel unit such as an LCD (Liquid crystal display) panel or an OLED (Organic light emitting diode) panel.

The information acquisition unit 21 acquires, at regular time intervals, the position information of the feed axes M1 and M2 when the intermittent cutting is performed. The regular time interval can be set to an integer multiple of the sampling control period (for example, the distribution period of command pulses) of the controller 11. The position information acquired by the information acquisition unit 21 is either the value of the feed command for the intermittent cutting or the actual positions (position feedback) of the feed axes M1 and M2 driven by the feed command. Furthermore, when the actual positions of the feed axes M1 and M2 are acquired as the position information of the feed axes M1 and M2, the actual positions may be the output values of the encoders included in the servo motors of the feed axes M1 and M2 or the positions of the movement ends of the feed axes M1 and M2, for example, the position of the tip end portion of the cutting tool 14, which are remotely measured with the position measuring device such as a laser tracker or a three-dimensional position sensor.

The information acquisition unit 21 acquires, as rotation information, the relative rotation speeds, rotation angles and angular velocities of the workpiece W and the cutting tool 14. In the case of the configuration shown in FIG. 1, in the machining program stored in the controller 11, the rotation speed of the spindle M0 (the rotation speed of the workpiece W) is previously set, and the information acquisition unit 21 acquires, as the rotation information (in other words, the phase information of the spindle M0), the rotation speed of the spindle M0 from the controller 11. Furthermore, as described previously, as the position detection device 15 of the spindle M0, the rotary encoder is used, and, during the intermittent cutting, the controller 11 can detect the rotation angle and the angular velocity of the spindle M0 with the rotary encoder. Hence, the information acquisition unit 21 can acquire, as the rotation information (in other words, the phase information of the spindle M0), not only the rotation speed but also the rotation angle and the angular velocity of the spindle M0 from the controller 11. The information acquisition unit 21 also has the function of storing, in a memory (not shown), the acquired chronological position information of the feed axes M1 and M2, the rotation speed, the rotation angle and the angular velocity of the spindle M0.

The display unit 22 displays, as the movement path information (path information) of the feed axes M1 and M2, information indicating a relationship between the phase of the spindle M0 and the positions of the feed axes M1 and M2. Specifically, the display unit 22 displays, based on the chronological position information of the feed axes M1 and M2 and the rotation information of the spindle M0 (for example, the rotation speed, the rotation angle or the angular velocity described above, that is, the phase information) acquired by the information acquisition unit 21, the path information in which the positions of the feed axes M1 and M2 are superimposed (returned) per revolution (or two revolutions, three revolutions, . . . ) of the spindle M0 and are displayed. For example, the display unit 22 displays the path information by dividing information indicating a chronological change of the positions of the feed axes M1 and M2 based on the chronological position information of the feed axes M1 and M2 acquired by the information acquisition unit 21 into pieces of partial data per rotation angle (360° or 2π) corresponding to one revolution of the spindle M0 (or rotation angles corresponding to a plurality of revolutions (two revolutions, three revolutions, . . . )) and sequentially shifting the pieces of partial data such that the pieces of partial data coincide with the start point (for example, an origin on the horizontal axis of FIG. 3) of the information.

The rotation angle of the workpiece W may be calculated from the rotation speed which is a setting value set in the machining program within the controller 11 or the rotation angle of the workpiece W may be actually detected from the encoder incorporated in the spindle M0. The display device 20 may perform, at the same regular time intervals, the detection of the rotation angle of the workpiece W and the acquisition of the position information of the feed axes M1 and M2 described above so as to display the path information in which the actual rotation angles and the position information of the feed axes M1 and M2 are associated with each other.

Figure 3:
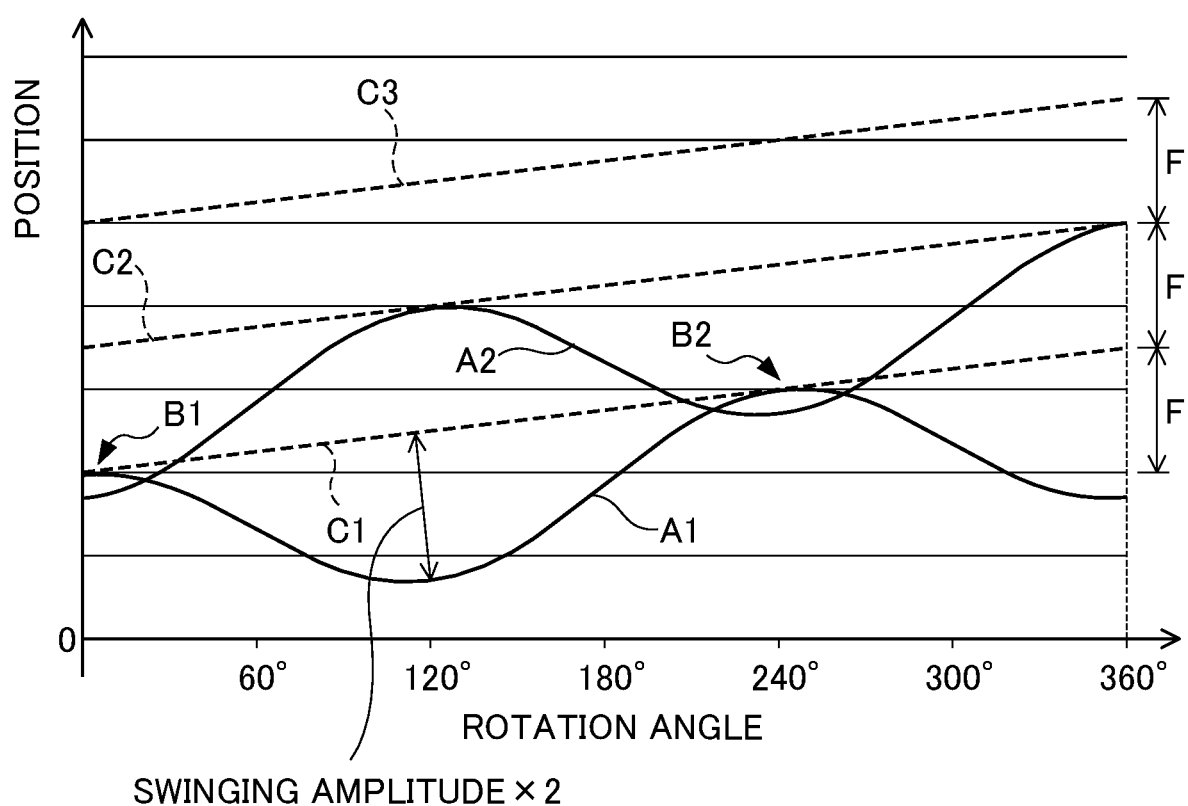
FIG. 3 is a diagram showing an example of path information displayed by a display unit in the display device shown in FIG. 1.

FIG. 3 is a diagram showing an example of the path information displayed by the display unit 22. A horizontal axis in FIG. 3 represents the rotation angle (that is, the phase of the spindle M0) of the spindle M0, and a vertical axis represents positions (that is, the positions of the feed axes M1 and M2) in the direction of the machining (that is, the first direction along the direction of the Z axis in FIG. 1). A curve A1 and a curve A2 shown in FIG. 3 correspond to, for example, the pieces of partial data obtained by dividing the chronological data (the wavy curve Q) of the feed command shown in FIG. 2C per revolution of the workpiece W, that is, the path information. The curve A1 indicates the path information in the first revolution of the workpiece W, and the curve A2 indicates the path information in the second revolution of the workpiece W. For simplification, the illustration of the path information in the third and subsequent revolutions of the workpiece W is omitted. The path information of the curves A1 and A2 and the like indicates the path of the cutting tool 14 on the workpiece W which is rotated. In FIG. 3, a plurality of linear broken lines C1, C2, C3, . . . which are obliquely extended are shown. The broken lines C1, C2 and C3 correspond to the position command (the dotted straight line P) shown in FIG. 2C, and the intervals between the broken lines C1, C2 and C3 in the direction of the vertical axis in FIG. 3 correspond to the feed amount per revolution F.

In FIG. 3, the curve A1 and the curve A2 overlap each other in the two parts B1 and B2. In the parts B1 and B2, the maximum value of the curve A1 with respect to the broken line C1 is larger than the minimum value of the curve A2 with respect to the broken line C2. In the overlapping parts B1 and B2, when the cutting tool 14 performs the machining along the path of the curve A2, the cutting tool 14 is separated from the workpiece W, with the result that the workpiece W is not machined. The overlapping parts B1 and B2 as described above are periodically produced, and thus the intermittent cutting described previously is realized. In an example shown in FIG. 3, chips are individually generated in the overlapping parts B1 and B2 by the operation corresponding to the curve A2. In other words, in the curve A2 of the second revolution, the two chips are generated.

Hence, the operator checks the presence of the overlapping parts B1 and B2 in which the previous curve A1 and the subsequent curve A2 overlap each other, and thereby can determine whether or not chips can be shredded. When the overlapping parts B1, B2 and the like are not produced, the operator changes the swinging frequency and the swinging amplitude in the swinging command shown in FIG. 2B. This change can be performed by adjusting the setting values such as a spindle rotation speed S, the feed amount per revolution F and the swinging frequency magnification I in the machining program within the controller 11. In order to produce the intended overlapping parts B1 and B2, the operator preferably changes the swinging frequency and the swinging amplitude while visually recognizing the path information displayed on the display unit 22 of the display device 20.

Figure 4:
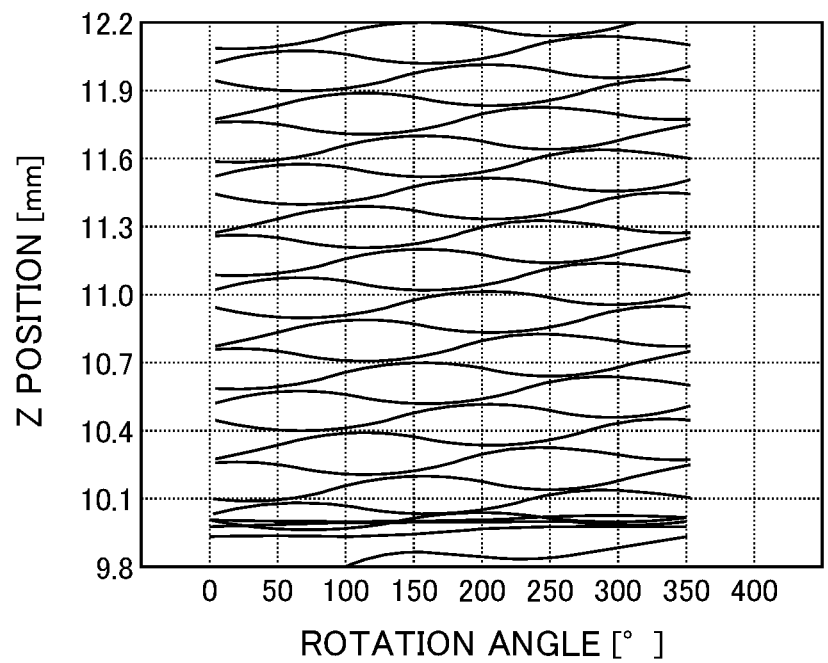
FIG. 4 is a diagram showing an example of the path information which is displayed by the display unit in the display device shown in FIG. 1 and in which swinging parameters are not appropriate.

Here, FIG. 4 is a diagram showing an example of the path information which is displayed by the display unit 22 and in which swinging parameters (for example, the swinging frequency (swinging period) and the swinging amplitude described above) are not appropriate. As shown in FIG. 4, when the swinging parameters are not appropriate, a path waveform becomes multiple, and thus the operator cannot easily check the operation of the machine tool. In this case, in addition to the chips not being efficiently cut, the quality of the cut surface of the workpiece may be degraded by an excessive swinging operation. Although it can be confirmed that the optimum state is not achieved, it is difficult to adjust the swinging parameters in order to bring the state close to the optimum state.

Figure 5A:
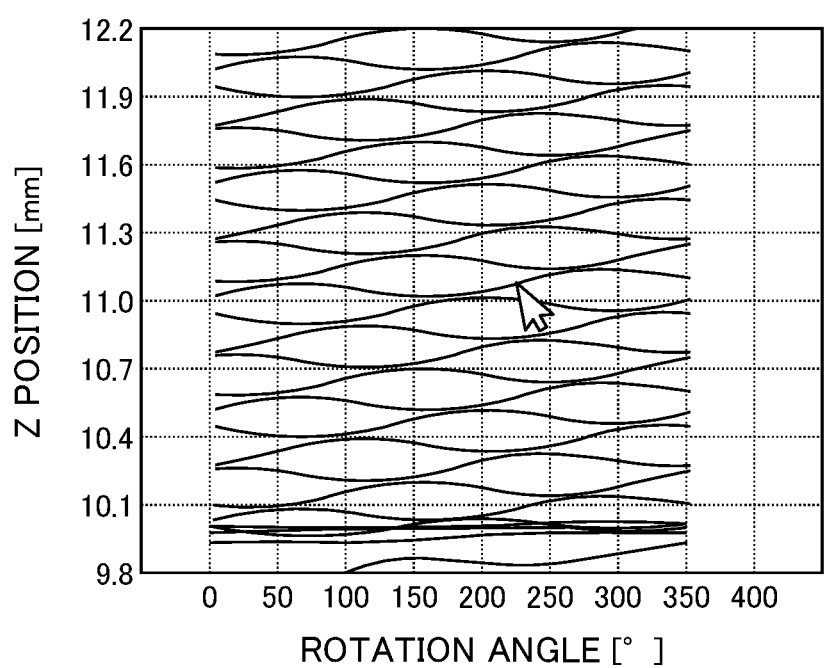
FIG. 5A is a diagram showing an example of the selection of the path information by a selection unit in the display device according to the first embodiment.

In this regard, in the present embodiment, the display selection unit 23 selects part of the path information displayed on the display unit 22. For example, the display selection unit 23 is a mouse when the display device 20 is a PC or the like. In this case, by an operation of the operator, as shown in FIG. 5A, the display selection unit 23 selects part of the path waveform displayed on the display unit 22 in synchronization with a pointer displayed on the display unit 22 such as a display. The display selection unit 23 may be a touch panel which is provided in the display unit 22 such as a display.

Figure 5B:
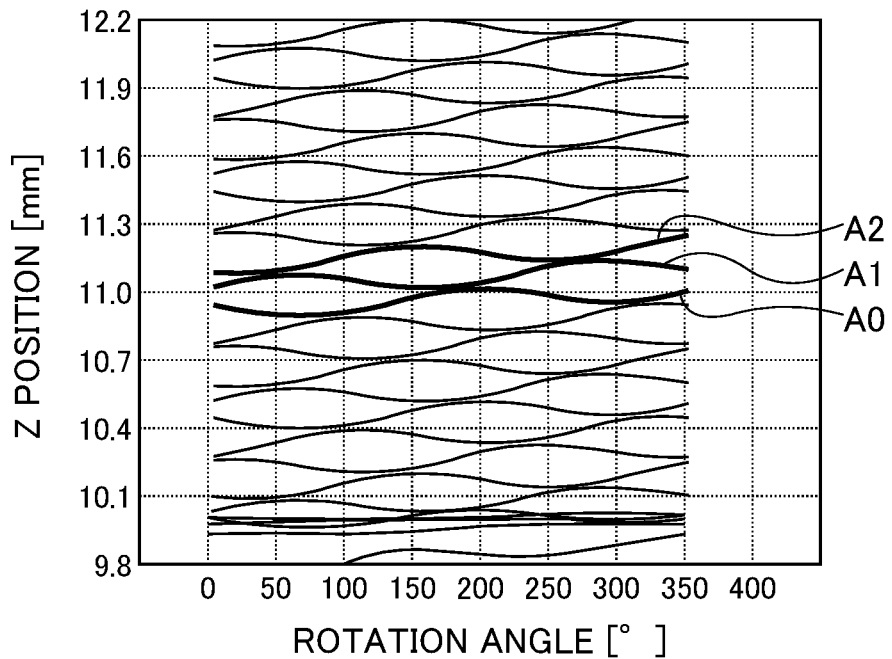
FIG. 5B is a diagram showing an example of the highlighting of the path information by the display unit in the display device according to the first embodiment.

As shown in FIG. 5B, the display unit 22 relatively highlights, in the displayed path information, a selection path A1 which includes the part selected by the display selection unit 23 and at least one of adjacent paths A0 and A2 preceding and subsequent to the selection path A1 with respect to the paths of the displayed path information other than the selection path A1 and the adjacent paths A0 and A2 (in other words, distinguishably displays them). The adjacent path A0 is an adjacent path which chronologically precedes the selection path A1, and the adjacent path A2 is an adjacent path which is chronologically subsequent to the selection path A1. When the swinging parameters are not appropriate, in FIG. 5B, it is likely that the adjacent paths A0 and A2 are spatially separated from the selection path A1. In other words, in FIG. 5B, the adjacent paths A0 and A2 may be spatially separated from the selection path A1. The selection path A1 and the adjacent paths A0 and A2 may be paths corresponding to one revolution of the spindle M0 as shown in FIG. 5B or may be paths corresponding to a plurality of revolutions of the spindle M0.

For example, the display unit 22 relatively changes the display attribute of the selection path A1 and the display attribute of the adjacent paths A0 and A2 with respect to the display attribute of the paths other than the selection path A1 and the adjacent paths A0 and A2 (in other words, makes them different) so as to perform highlighting. Examples of the display attribute include colors, line widths (thicknesses), line types (a solid line, a broken line and the like), shades and transparency.

Figure 6A:
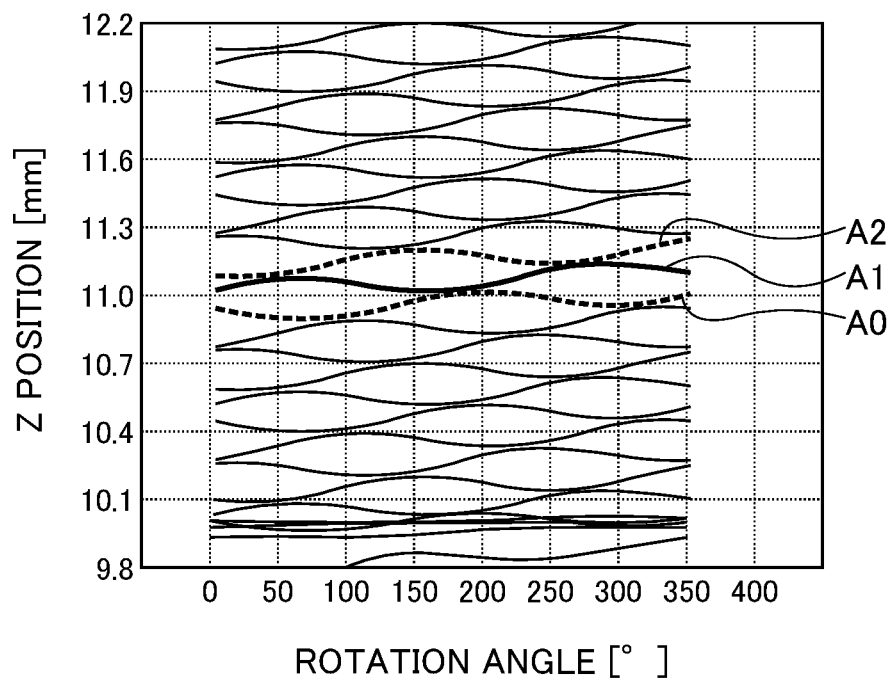
FIG. 6A is a diagram showing another example of the highlighting of the path information by the display unit in the display device according to the first embodiment.

As shown in FIG. 6A, the display unit 22 may relatively highlight the selection path A1 with respect to the adjacent paths A0 and A2. For example, likewise, the display unit 22 relatively changes the display attribute of the selection path A1 with respect to the display attribute of the adjacent paths A0 and A2 (in other words, makes them different) so as to perform highlighting.

Figure 6B:
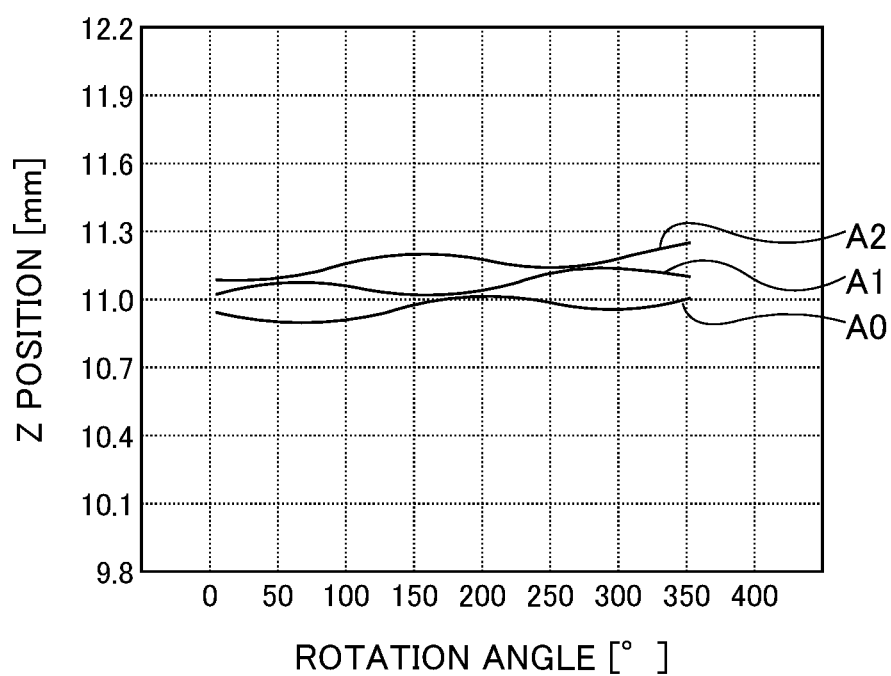
FIG. 6B is a diagram showing another example of the highlighting of the path information by the display unit in the display device according to the first embodiment.

Alternatively, as shown in FIG. 6B, the display unit 22 may not display the paths other than the selection path A1 and the adjacent paths A0 and A2 so as to relatively highlight the selection path A1 and the adjacent paths A0 and A2 with respect to the paths other than the selection path A1 and the adjacent paths A0 and A2.

The display unit 22 may use, as the selection path A1, a path in which the part selected by the display selection unit 23 is set as a start point or an end point and which corresponds to one revolution (or a plurality of revolutions) of the spindle M0. Alternatively, the display unit 22 may use, as the selection path A1, a path in which the part selected by the display selection unit 23 is set as a center and which corresponds to one revolution (or a plurality of revolutions) of the spindle M0. The display unit 22 may divide the displayed path information into paths corresponding to one revolution (or a plurality of revolutions) of the spindle M0 before the selection of the display selection unit 23 or may divide the displayed path information after the selection of the display selection unit 23.

Figure 5C:
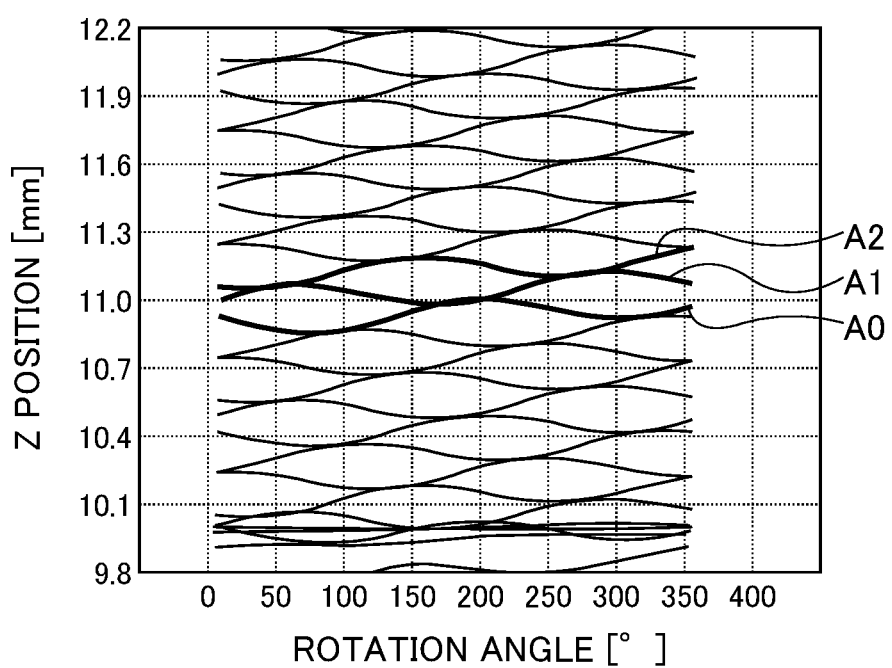
FIG. 5C is a diagram showing an example of the path information which is displayed by the display unit in the display device according to the first embodiment and in which the swinging parameters are appropriate.

In this way, a relationship between the selection path A1 corresponding to one revolution (or a plurality of revolutions) of the spindle M0 and the adjacent paths A0 and A2 preceding and subsequent to the selection path A1 is clarified, and thus it is easy to adjust the swinging parameters such that, as shown in FIG. 5C, the peak and the valley of the path waveform overlap each other per revolution of the spindle M0.

As described above, with the display device 20 of the present embodiment, the operator can easily determine whether or not the chips can be shredded in the intermittent cutting (swinging cutting). In this way, the operator can more reliably adjust the swinging amplitude in order to shred the chips, and thus it is possible to realize the intermittent cutting in which the chips are shredded as intended.

When a backlash is provided in the drive mechanism unit of the cutting tool 14 or the rigidity of the drive mechanism unit is low, it is likely that vibrations occur during the intermittent cutting and that thus the accuracy of the position of the cutting tool 14 is not stabilized. For example, it is likely that, even when the feed axis M1 is driven based on the feed command for the intermittent cutting, the actual position of the cutting tool 14 does not completely follow the curves A1 and A2 as shown in FIG. 3. In other words, even when the command value is regarded such that the chips can be shredded, in actuality, it is likely that the chips are not shredded as intended. In this regard, the display device 20 of the present embodiment detects a chronological change of the actual position of the feed axis M1 with the position detection device 15 such as an encoder, and the path information described previously is generated based on the detection data and can be displayed on the display unit 22. Hence, the operator sees the path information based on the actual positions of the feed axes M1 and M2 as described above, and thereby can accurately determine whether or not the chips are actually shredded.

When the turning is performed on the cylindrical workpiece W, the rotation speed S of the workpiece W is preferably constant. On the other hand, when the turning is performed on the workpiece W having a conical shape, a truncated conical shape or the like, the diameter of part of the workpiece with which the tip end of the cutting tool 14 makes contact is changed according to the feed position of the cutting tool 14 in the direction of the machining (the direction along the direction of the Z axis in FIG. 1). In this case, when the rotation speed S of the workpiece W is constant, the surface speed (that is, the cutting speed) of the part of the workpiece W with which the cutting tool 14 makes contact changes according to the position of the cutting tool 14 in the direction of the machining, and thus it is likely that a uniform machined surface cannot be obtained. Hence, in order for the surface speed to be made constant, the rotation speed S of the workpiece W may be determined by a function that changes according to the diameter of the part of the workpiece with which the tip end of the cutting tool 14 makes contact.

The controller 11 and the display device 20 described above are formed with a computer that includes a memory such as a ROM (read only memory) and a RAM (random access memory), a CPU (control processing unit) and a communication control unit which are connected to each other through a bus. Furthermore, individual function units such as the information acquisition unit 21 which form the display device 20 can be achieved by the coordination of the CPU and the memory incorporated in the computer and a control program stored in the memory.

Second Embodiment

In the first embodiment, the display unit 22 of the display device 20 displays, as the movement path information (path information) of the feed axes M1 and M2, information indicating the relationship between the phase of the spindle M0 and the positions of the feed axes M1 and M2. In a second embodiment, the display unit 22 of a display device 20 displays, as the movement path information of the feed axes M1 and M2, information indicating a chronological change of the positions of the feed axes M1 and M2.

The configuration of the display device 20 according to the second embodiment is the same as the configuration of the display device 20 of the first embodiment shown in FIG. 1. In the display device 20 according to the second embodiment, the function and the operation of the display unit 22 differ from the display device 20 of the first embodiment.

As described above, the display unit 22 displays, as the movement path information of the feed axes M1 and M2, the information indicating the chronological change of the positions of the feed axes M1 and M2. Specifically, the display unit 22 displays, based on the chronological position information of the feed axes M1 and M2 acquired by the information acquisition unit 21, the path information indicating the chronological change of the positions of the feed axes M1 and M2. For example, when the feed command for the intermittent cutting is acquired by the information acquisition unit 21, the wavy curve Q as shown in FIG. 2C corresponds to the path information. However, the displayed path information may be information which is obtained by associating the output values of the encoders incorporated in the servo motors of the feed axes M1 and M2 with time or information which is obtained by associating the position of the tip end of the cutting tool 14 remotely measured with the position measuring device with time. In other words, the path information may be data based on the position command values for the feed axes M1 and M2 or waveform data based on the actual positions of the feed axes M1 and M2.

Figure 7A:
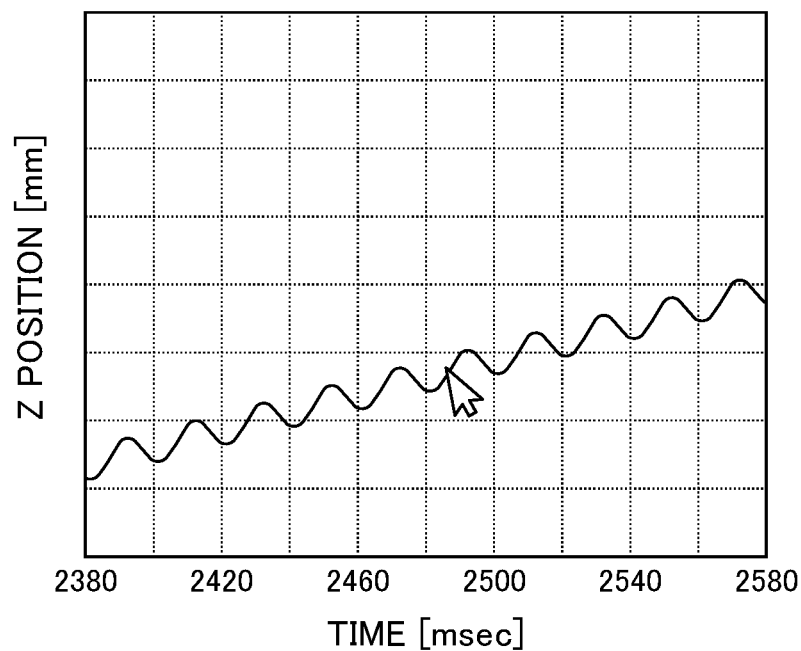
FIG. 7A is a diagram showing an example of the selection of path information by a selection unit in a display device according to a second embodiment.

Even in the present embodiment, the display selection unit 23 selects part of the path information displayed on the display unit 22. For example, by an operation of the operator, as shown in FIG. 7A, the display selection unit 23 selects part of the path waveform displayed on the display unit 22 in synchronization with a pointer displayed on the display unit 22.

Figure 7B:
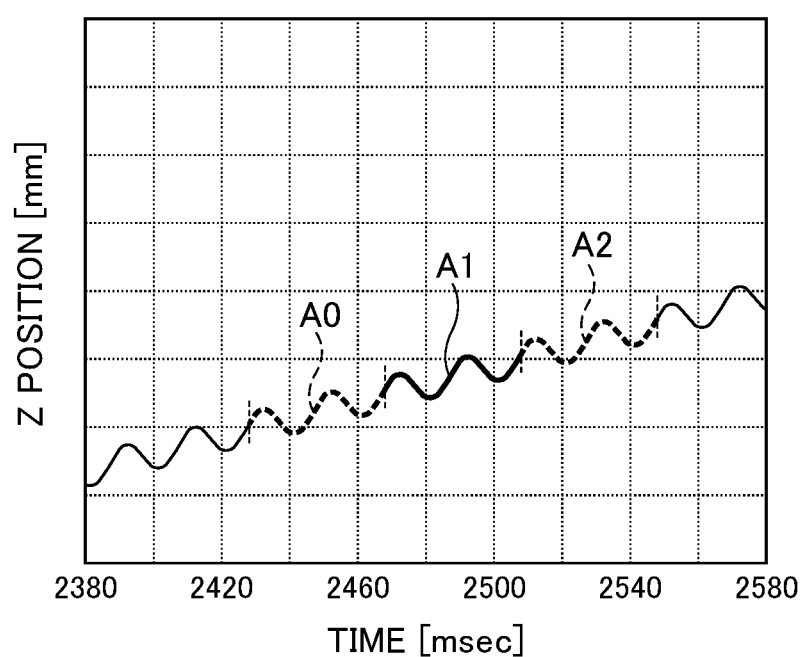
FIG. 7B is a diagram showing an example of the highlighting of the path information by the display unit in the display device according to the second embodiment.

As shown in FIG. 7B, the display unit 22 relatively highlights, in the displayed path information, a selection path A1 which includes the part selected by the display selection unit 23 and at least one of adjacent paths A0 and A2 preceding and subsequent to the selection path A1 with respect to the paths of the displayed path information other than the selection path A1 and the adjacent paths A0 and A2. The selection path A1 and the adjacent paths A0 and A2 may be paths corresponding to one revolution of the spindle M0 as shown in FIG. 7B or may be paths corresponding to a plurality of revolutions of the spindle M0. For example, the display unit 22 relatively changes the display attribute of the selection path A1 and the display attribute of the adjacent paths A0 and A2 with respect to the display attribute of the paths other than the selection path A1 and the adjacent paths A0 and A2 so as to perform highlighting.

As shown in FIG. 7B, the display unit 22 may relatively highlight the selection path A1 with respect to the adjacent paths A0 and A2. For example, likewise, the display unit 22 relatively changes the display attribute of the selection path A1 with respect to the display attribute of the adjacent paths A0 and A2 so as to perform highlighting.

Alternatively, likewise, the display unit 22 may not display the paths other than the selection path A1 and the adjacent paths A0 and A2 so as to relatively highlight the selection path A1 and the adjacent paths A0 and A2 with respect to the paths other than the selection path A1 and the adjacent paths A0 and A2.

Likewise, the display unit 22 may use, as the selection path A1, a path in which the part selected by the display selection unit 23 is set as a start point or an end point and which corresponds to one revolution (or a plurality of revolutions) of the spindle M0. Alternatively, the display unit 22 may use, as the selection path A1, a path in which the part selected by the display selection unit 23 is set as a center and which corresponds to one revolution (or a plurality of revolutions) of the spindle M0. The display unit 22 may divide the displayed path information into paths corresponding to one revolution (or a plurality of revolutions) of the spindle M0 before the selection of the display selection unit 23 or may divide the displayed path information after the selection of the display selection unit 23.

Here, when the swinging period is an integer multiple of the rotation period of the spindle M0, the peak and the valley of the path waveform do not overlap each other per revolution of the spindle M0, and thus the chips are not shredded in the intermittent cutting (swinging cutting). In this regard, in the display device 20 of the present embodiment, even when the path information indicates a chronological change of the positions of the feed axes M1 and M2, the selection path A1 corresponding to one revolution (or a plurality of revolutions) of the spindle M0 and the adjacent paths A0 and A2 preceding and subsequent to the selection path A1 are relatively highlighted with respect to the paths other than the selection path A1 and the adjacent paths A0 and A2, with the result that the operator can easily determine whether or not the swinging period is an integer multiple of the rotation period of the spindle M0, that is, whether or not the chips can be shredded in the intermittent cutting (swinging cutting). It is also easy to adjust the swinging parameters.

As described above, even in the display device 20 of the second embodiment, as in the display device 20 of the first embodiment, the operator can easily determine whether or not the chips can be shredded in the intermittent cutting (swinging cutting). In this way, the operator can more reliably adjust the swinging amplitude in order to shred the chips, and thus it is possible to realize the intermittent cutting in which the chips are shredded as intended.

(Variation of First Embodiment)

Figure 8A:
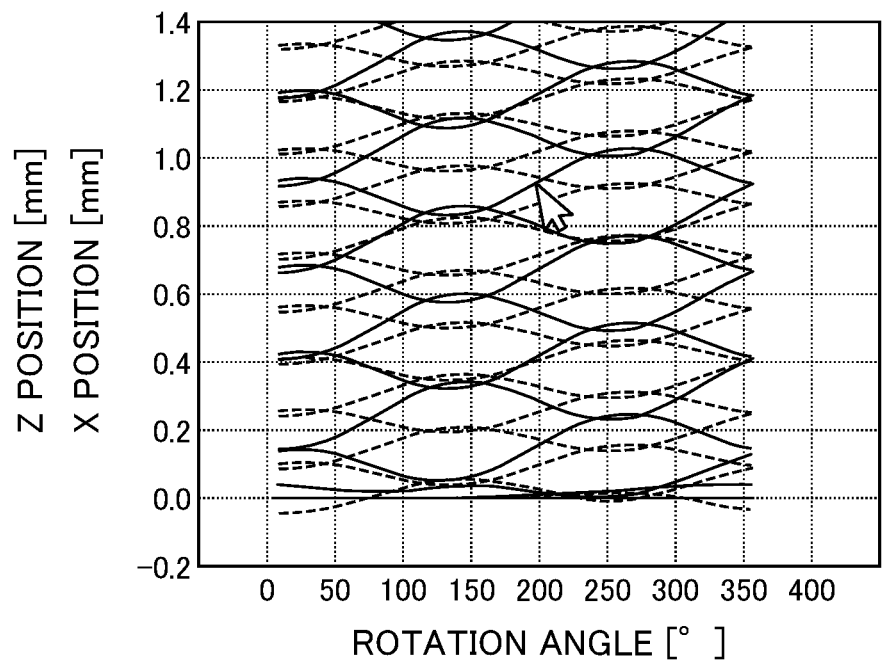
FIG. 8A is a diagram showing an example of the selection of path information by a selection unit in a display device according to a variation of the first embodiment.

In the first embodiment described previously, the display unit 22 of the display device 20 may superimpose and display a plurality of pieces of movement path information (path information) of the feed axes M1 and M2. For example, as shown in FIG. 8A, the display unit 22 superimposes and displays first path information (solid lines) indicating a relationship between the phase of the spindle M0 and the position (Z position in the direction of the feeding) of the first feed axis M1 and second path information (broken lines) indicating a relationship between the phase of the spindle M0 and the position (X position in the direction of the cutting) of the second feed axis M2.

Here, the display selection unit 23 selects part of the path information displayed on the display unit 22. For example, by an operation of the operator, as shown in FIG. 8A, the display selection unit 23 selects part of a first path waveform displayed on the display unit 22 in synchronization with the pointer displayed on the display unit 22.

Figure 8B:
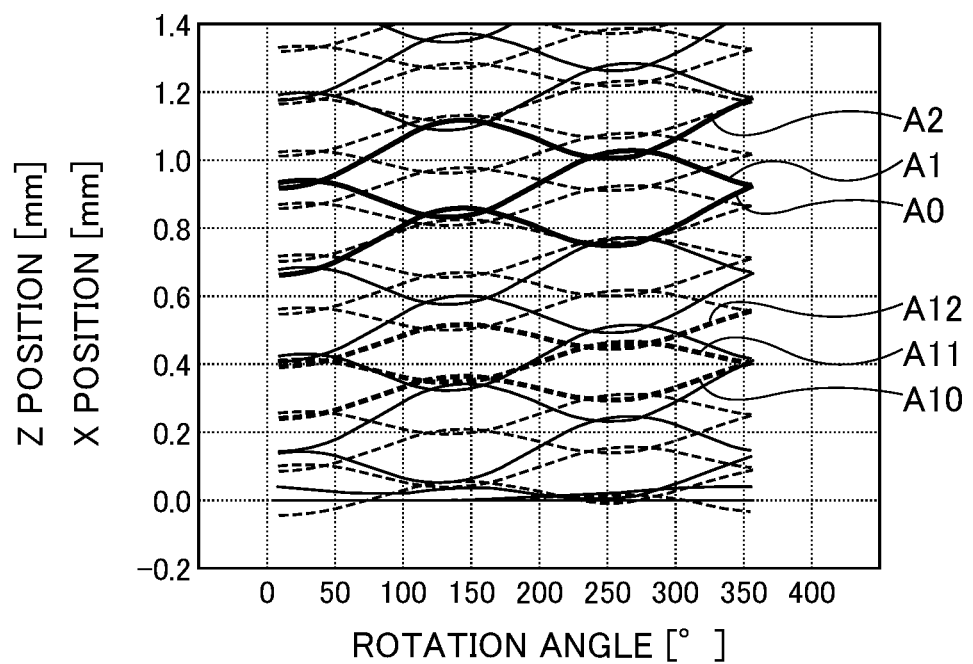
FIG. 8B is a diagram showing an example of the highlighting of the path information by the display unit in the display device according to the variation of the first embodiment.

As shown in FIG. 8B, the display unit 22 relatively highlights, in the displayed first path information (solid lines), a first selection path A1 which includes the part selected by the display selection unit 23 and at least one of first adjacent paths A0 and A2 preceding and subsequent to the first selection path A1 with respect to the paths of the displayed first path information other than the first selection path A1 and the first adjacent paths A0 and A2. The display unit 22 may relatively highlight, in the displayed second path information (broken lines), a second selection path A11 corresponding to the first selection path A1 and at least one of second adjacent paths A10 and A12 preceding and subsequent to the second selection path A11 with respect to the paths of the displayed second path information other than the second selection path A11 and the second adjacent paths A10 and A12. The first adjacent path A0 is an adjacent path which chronologically precedes the first selection path A1, and the first adjacent path A2 is an adjacent path which is chronologically subsequent to the first selection path A1. The second adjacent path A10 is an adjacent path which chronologically precedes the second selection path A11, and the second adjacent path A12 is an adjacent path which is chronologically subsequent to the second selection path A11. In FIG. 8B, the first adjacent paths A0 and A2 may be spatially separated from the first selection path A1, and the second adjacent paths A10 and A12 may be spatially separated from the second selection path A11. The first selection path A1, the first adjacent paths A0 and A2, the second selection path A11 and the second adjacent paths A10 and A12 may be paths corresponding to one revolution of the spindle M0 as shown in FIG. 8B or may be paths corresponding to a plurality of revolutions of the spindle M0. For example, the display unit 22 relatively changes the display attribute of the first selection path A1 and the display attribute of the first adjacent paths A0 and A2 with respect to the display attribute of the paths other than the first selection path A1 and the first adjacent paths A0 and A2 so as to perform highlighting. The display unit 22 may relatively change the display attribute of the second selection path A11 and the display attribute of the second adjacent paths A10 and A12 with respect to the display attribute of the paths other than the second selection path A11 and the second adjacent paths A10 and A12 so as to perform highlighting.

Furthermore, the display unit 22 may relatively highlight the first selection path A1 with respect to the first adjacent paths A0 and A2. The display unit 22 may relatively highlight the second selection path A11 with respect to the second adjacent paths A10 and A12. For example, the display unit 22 may relatively change the display attribute of the first selection path A1 with respect to the display attribute of the first adjacent paths A0 and A2 so as to perform highlighting. The display unit 22 may relatively change the display attribute of the second selection path A11 with respect to the display attribute of the second adjacent paths A10 and A12 so as to perform highlighting.

Alternatively, the display unit 22 may not display the paths other than the first selection path A1 and the first adjacent paths A0 and A2 so as to relatively highlight the first selection path A1 and the first adjacent paths A0 and A2 with respect to the paths other than the first selection path A1 and the first adjacent paths A0 and A2. The display unit 22 may not display the paths other than the second selection path A11 and the second adjacent paths A10 and A12 so as to relatively highlight the second selection path A11 and the second adjacent paths A10 and A12 with respect to the paths other than the second selection path A11 and the second adjacent paths A10 and A12.

In the present variation, for example, when swinging cutting is performed with a plurality of feed axes M1 and M2 as with machining in a tapered shape, the path information (Z position in the direction of the feeding, X position in the direction of the cutting) of the feed axes M1 and M2 in the same time range is highlighted, and thus the operator can easily determine whether or not the chips can be shredded in the intermittent cutting (swinging cutting). It is also easy to adjust the swinging parameters.

(Variation of Second Embodiment)

Figure 9A:
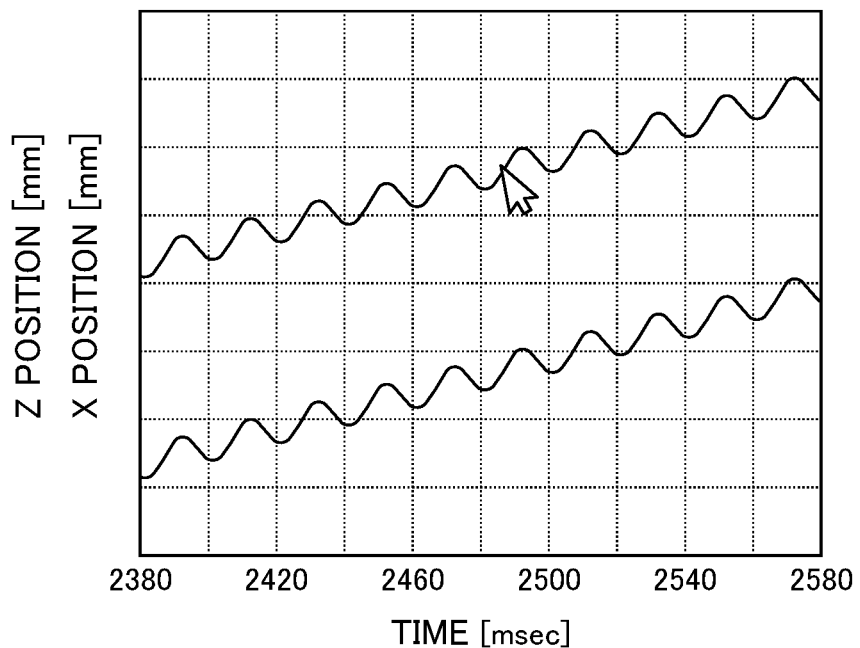
FIG. 9A is a diagram showing an example of the selection of path information by a selection unit in a display device according to a variation of the second embodiment.

Likewise, in the second embodiment described previously, the display unit 22 of the display device 20 may superimpose and display a plurality of pieces of movement path information (path information) of a plurality of feed axes M1 and M2. For example, as shown in FIG. 9A, the display unit 22 superimposes and displays first path information (upper) indicating a chronological change of the position (Z position in the direction of the feeding) of the first feed axis M1 and second path information (lower) indicating a chronological change of the position (X position in the direction of the cutting) of the second feed axis M2.

Here, the display selection unit 23 selects part of the path information displayed on the display unit 22. For example, by an operation of the operator, as shown in FIG. 9A, the display selection unit 23 selects part of a first path waveform displayed on the display unit 22 in synchronization with the pointer displayed on the display unit 22.

Figure 9B:
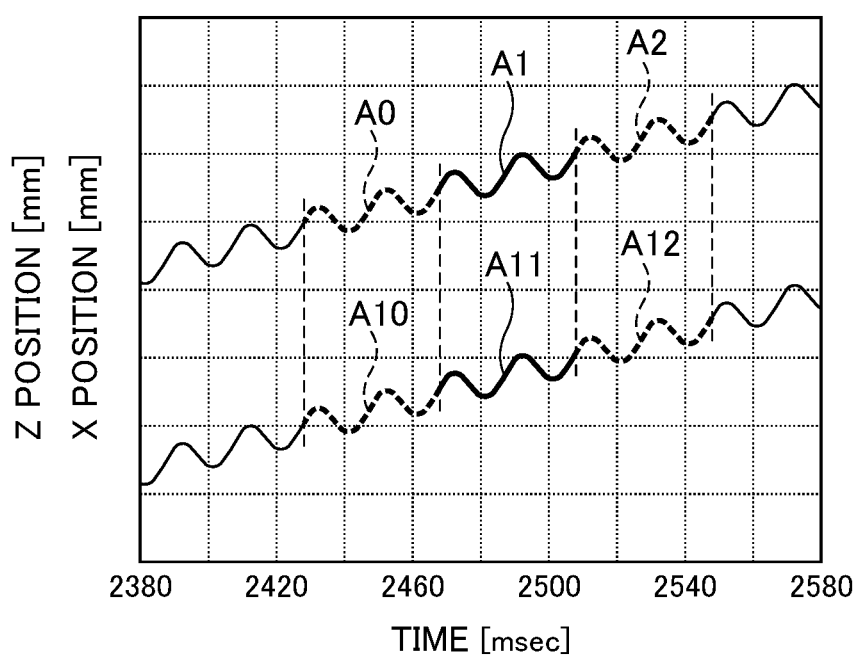
FIG. 9B is a diagram showing an example of the highlighting of the path information by the display unit in the display device according to the variation of the second embodiment.

As shown in FIG. 9B, the display unit 22 relatively highlights, in the displayed first path information (upper), a first selection path A1 which includes the part selected by the display selection unit 23 and at least one of first adjacent paths A0 and A2 preceding and subsequent to the first selection path A1 with respect to the paths of the displayed first path information other than the first selection path A1 and the first adjacent paths A0 and A2. The display unit 22 may relatively highlight, in the displayed second path information (lower), a second selection path A11 corresponding to the first selection path A1 and at least one of second adjacent paths A10 and A12 preceding and subsequent to the second selection path A11 with respect to the paths of the displayed second path information other than the second selection path A11 and the second adjacent paths A10 and A12. The first selection path A1, the first adjacent paths A0 and A2, the second selection path A11 and the second adjacent paths A10 and A12 may be paths corresponding to one revolution of the spindle M0 as shown in FIG. 9B or may be paths corresponding to a plurality of revolutions of the spindle M0. For example, the display unit 22 relatively changes the display attribute of the first selection path A1 and the display attribute of the first adjacent paths A0 and A2 with respect to the display attribute of the paths other than the first selection path A1 and the first adjacent paths A0 and A2 so as to perform highlighting. The display unit 22 may relatively change the display attribute of the second selection path A11 and the display attribute of the second adjacent paths A10 and A12 with respect to the display attribute of the paths other than the second selection path A11 and the second adjacent paths A10 and A12 so as to perform highlighting.

Furthermore, as shown in FIG. 9B, the display unit 22 may relatively highlight the first selection path A1 with respect to the first adjacent paths A0 and A2. The display unit 22 may relatively highlight the second selection path A11 with respect to the second adjacent paths A10 and A12. For example, the display unit 22 may relatively change the display attribute of the first selection path A1 with respect to the display attribute of the first adjacent paths A0 and A2 so as to perform highlighting. The display unit 22 may relatively change the display attribute of the second selection path A11 with respect to the display attribute of the second adjacent paths A10 and A12 so as to perform highlighting.

Alternatively, the display unit 22 may not display the paths other than the first selection path A1 and the first adjacent paths A0 and A2 so as to relatively highlight the first selection path A1 and the first adjacent paths A0 and A2 with respect to the paths other than the first selection path A1 and the first adjacent paths A0 and A2. The display unit 22 may not display the paths other than the second selection path A11 and the second adjacent paths A10 and A12 so as to relatively highlight the second selection path A11 and the second adjacent paths A10 and A12 with respect to the paths other than the second selection path A11 and the second adjacent paths A10 and A12.

Even in the present variation, for example, when swinging cutting is performed with a plurality of feed axes M1 and M2 as with machining in a tapered shape, the path information (Z position in the direction of the feeding, X position in the direction of the cutting) of the feed axes M1 and M2 in the same time range are highlighted, and thus the operator can easily determine whether or not the chips can be shredded in the intermittent cutting (swinging cutting). It is also easy to adjust the swinging parameters.

Although the embodiments of the present invention are described above, the present invention is not limited to the embodiments described above, and various modifications and variations are possible. For example, although in the embodiments described above, the configuration in which the workpiece W is rotated and in which the cutting tool 14 swings along the generatrix of the outer circumferential surface of the workpiece W is illustrated, the present invention is not limited to this configuration. The machine tool according to the present invention may have a configuration in which the spindle M0 that relatively rotates the workpiece W and the cutting tool 14 about the center axis line of the workpiece W and at least one of the feed axes M1, M2 that relatively feed the workpiece W and the cutting tool 14 in the direction of the machining along the center axis line and the like are controlled, and in which thus the turning is performed on the workpiece W. For example, a configuration in which the cutting tool 14 is rotated about the center axis line of the workpiece W and in which the workpiece W swings with respect to the cutting tool 14 or a configuration in which the workpiece W is rotated and in which the workpiece W swings with respect to the cutting tool 14 in a direction along the generatrix of the outer circumferential surface of the workpiece W can be assumed. In the present invention, a machining method in which the cutting tool 14 is rotated about the center axis line of the workpiece W so as to perform cutting on the workpiece W is assumed to be one type of turning.

Although in the variation of the first embodiment and the variation of the second embodiment described above, the display unit 22 of the display device 20 superimposes and displays the two pieces of movement path information of the feed axes M1 and M2, the display unit 22 of the display device 20 may superimpose and display three or more pieces of movement path information of the feed axes M1 and M2. For example, the feed axes may include N feed axes of the first to Nth feed axes, and the display unit may superimpose and display the first to Nth pieces of path information of the first to Nth feed axes (N is an integer equal to or greater than 2). When the selection unit selects part of the first piece of path information, the display unit relatively highlights, in the first piece of path information, a first selection path which includes the part selected by the selection unit and at least one of first adjacent paths preceding and subsequent to the first selection path with respect to the paths of the first piece of path information other than the first selection path and the first adjacent paths. Here, the display unit sequentially performs the following processing on the second to Nth pieces of path information which are not selected by the selection unit. The display unit relatively highlights, in the nth piece of path information among the second to Nth pieces of path information, the nth selection path corresponding to the first selection path and at least one of the nth adjacent paths preceding and subsequent to the nth selection path with respect to the paths of the nth piece of path information other than the nth selection path and the nth adjacent paths (n is an integer equal to or greater than 2 and equal to or less than N). The first selection path and the first adjacent paths in the first piece of path information and the nth selection path and the nth adjacent paths in the nth piece of path information among the second to Nth pieces of path information are paths corresponding to one revolution or a plurality of revolutions of the spindle.

EXPLANATION OF REFERENCE NUMERALS 1 machining system
10 machine tool
11 controller
13 drive axis
14 cutting tool
15 position detection device
20 display device
21 information acquisition unit
22 display unit
23 display selection unit
A1, A11 selection path
A0, A2, A10, A12 adjacent path
M0 spindle
M1, M2 feed axis
W workpiece

What is claimed is:

1. A display device which acquires and displays path information of a feed axis of a machine tool that includes a spindle for relatively rotating a workpiece and a cutting tool and at least one of the feed axis for relatively feeding the workpiece and the cutting tool and that performs machining on the workpiece while making the cutting tool and the workpiece swing relatively, the display device comprising:
   a display, and
   a processor configured to,
      present the path information of the feed axis on the display, the presenting including stacking parts of a path corresponding to the path information within a graph in a direction corresponding to an axis of the graph that is associated with a feed position of the cutting tool,
      select one of the stacked parts of the path corresponding to the path information, and
      relatively highlight, in the path information presented on the display, a selection part which includes the selected one of the stacked parts corresponding to the path information and at least one adjacent stacked part of the path preceding or subsequent to the selection part with respect to at least one other stacked part of the path corresponding to the path information other than the selection part and the at least one adjacent stacked part, wherein each of the selection part and the at least one adjacent stacked part corresponds to one revolution or a plurality of revolutions of the spindle.

2. The display device according to claim 1, wherein the processor is further configured to present, on the display, as the path information of the feed axis, information indicating a relationship between a phase of the spindle and a position of the feed axis.

3. The display device according to claim 1, wherein the processor is further configured to present, on the display, as the path information of the feed axis, information indicating a chronological change of a position of the feed axis.

4. The display device according to claim 1, wherein the processor is further configured to relatively highlight, on the display, the selection part with respect to the at least one adjacent stacked part.

5. The display device according to claim 1, wherein the processor is further configured to relatively change, on the display, a display attribute of the selection part and a display attribute of the at least one adjacent stacked part with respect to a display attribute of at least one other stacked part of the path other than the selection part and the at least one adjacent stacked part so as to perform highlighting.

6. The display device according to claim 4, wherein the processor is further configured to relatively change, on the display, a display attribute of the selection part with respect to a display attribute of the at least one adjacent stacked part so as to perform highlighting.

7. The display device according to claim 1, wherein the feed axis includes a first feed axis and a second feed axis, the processor is further configured to, superimpose, on the display, first path information of the first feed axis and second path information of the second feed axis, relatively highlight, on the display, in the first path information, a first selection part including the selected one of the stacked parts of the path corresponding to the path information and at least one first adjacent stacked part of the path preceding or subsequent to the first selection part with respect to at least one other stacked part of the path corresponding to the first path information other than the first selection part and the at least one first adjacent stacked part, and relatively highlight, on the display, in the second path information, a second selection part corresponding to the first selection part and at least one second adjacent stacked part preceding or subsequent to the second selection part with respect to at least one other stacked part of the second path information other than the second selection part and the at least one second adjacent stacked part, and each of the first selection part, the at least one first adjacent stacked part, the second selection part, and the at least one second adjacent part corresponds to one revolution or a plurality of revolutions of the spindle.

8. The display device according to claim 1, wherein the processor is further configured to present the path information on the display based on a rotation angle of one rotation of the workpiece.

9. The display device according to claim 1, wherein the processor is further configured to present a rotation angle of the workpiece on the display.

10. The display device according to claim 1, wherein the processor is further configured to display a rotation angle of the workpiece as a horizontal axis of a chart of the path information.

* * * * *